(12) United States Patent
Hazelden

(10) Patent No.: US 8,415,960 B2
(45) Date of Patent: Apr. 9, 2013

(54) CAPACITANCE SENSING APPARATUS

(75) Inventor: Roger John Hazelden, Tamworth (GB)

(73) Assignee: TRW Limited, West Midlands (GB)

( * ) Notice: Subject to any disclaimer, the term of this patent is extended or adjusted under 35 U.S.C. 154(b) by 0 days.

(21) Appl. No.: 12/516,063

(22) PCT Filed: Nov. 26, 2007

(86) PCT No.: PCT/GB2007/004503
§ 371 (c)(1),
(2), (4) Date: Mar. 17, 2010

(87) PCT Pub. No.: WO2008/062217
PCT Pub. Date: May 29, 2008

(65) Prior Publication Data
US 2010/0182018 A1 Jul. 22, 2010

(30) Foreign Application Priority Data

Nov. 24, 2006 (GB) .................................. 0623432.2

(51) Int. Cl.
*G01R 27/26* (2006.01)
(52) U.S. Cl. ........ 324/662; 324/644; 324/671; 324/716; 324/635
(58) Field of Classification Search .................. None
See application file for complete search history.

(56) References Cited

U.S. PATENT DOCUMENTS 5,237,879 A * 8/1993 Speeter .................... 73/862.041
5,565,658 A 10/1996 Gerpheide et al.
5,764,066 A * 6/1998 Novak et al. .................. 324/662
(Continued)

FOREIGN PATENT DOCUMENTS

| EP | 1291205 A2 | 3/2003 |
| JP | 1293421 A | 11/1989 |
| WO | 2004053576 A1 | 6/2004 |

OTHER PUBLICATIONS

International Search Report for PCT/GB2007/004503 dated Jun. 6, 2008.
Search Report for GB 0623432.2 dated Mar. 26, 2007.

*Primary Examiner* — Huy Q Phan
*Assistant Examiner* — Temilade S Rhodes-Vivour
(74) *Attorney, Agent, or Firm* — MacMillan, Sobanski & Todd, LLC

(57) ABSTRACT

A capacitance sensing apparatus for use in a position sensing apparatus, comprising a first set of electrodes and a second set of electrodes and a capacitance sensing circuit arranged to determine, in use in a normal operating mode, the capacitance between each pairing of electrodes comprising one from the first set and one from the second set, in which the apparatus is further provided with at least one group switch arranged to selectively electrically connect together groups of the electrodes within the sets of electrodes, in which, in use in a low resolution mode of the apparatus the or each group switch connects together the groups of electrodes and the capacitance sensing circuit is arranged to determine the capacitance between the each pairing of groups of electrodes in one set and the electrodes or groups of electrodes of the other set. Typically, the apparatus is used in conjunction with a display to form a touch-sensitive display. It may be used in a position sensing apparatus for determining the proximity and position of an object to the apparatus, and is particularly applicable to use in a console of a motor vehicle of the type having the console centrally between two passenger seats.

13 Claims, 3 Drawing Sheets

U.S. PATENT DOCUMENTS

| | | |
|---|---|---|
| 5,861,875 A | 1/1999 | Gerpheide |
| 7,375,535 B1 * | 5/2008 | Kutz et al. ............... 324/658 |
| 2004/0158374 A1 | 8/2004 | Suzuki |
| 2005/0194959 A1 * | 9/2005 | Miller .................... 324/67 |

* cited by examiner

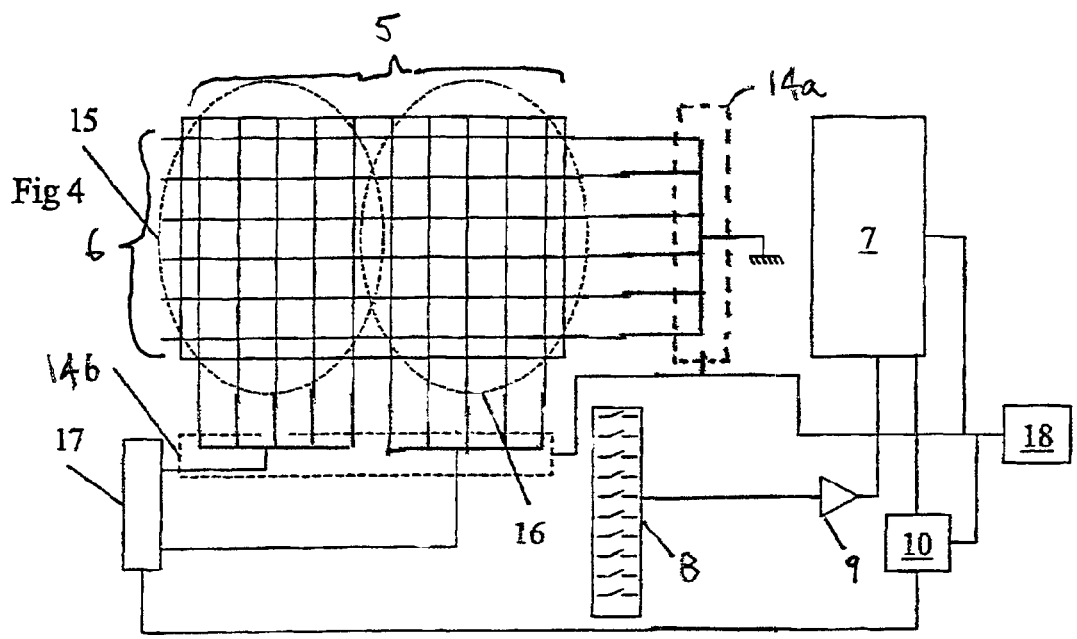
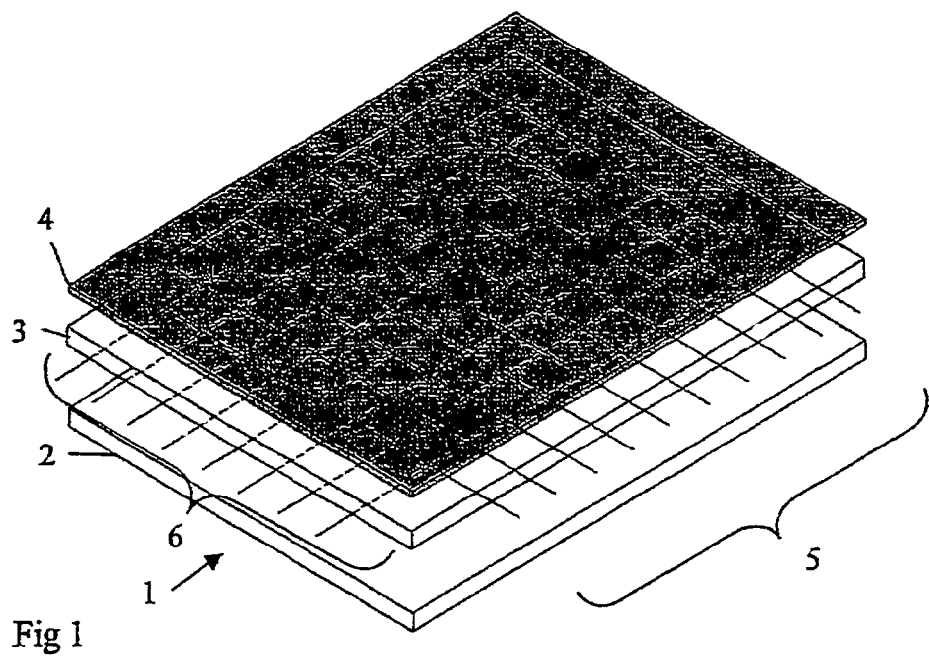
Fig 1

CAPACITANCE SENSING APPARATUS

CROSS-REFERENCE TO RELATED APPLICATIONS

This application is a national stage of International Application No. PCT/GB2007/004503 filed Nov. 26, 2007, the disclosures of which are incorporated herein by reference in their entirety, and which claimed priority to Great Britain Patent Application No. 0623432.2 filed Nov. 24, 2006, the disclosures of which are incorporated herein by reference in their entirety.

BACKGROUND OF THE INVENTION

This invention relates to a capacitance sensing apparatus for use in a position sensing system.

Capacitive proximity sensing is well known in the prior art. By measuring changes in capacitance across two conductors, a suitable circuit can detect the proximity of a capacitive object, including body parts such as a human finger. The change in capacitance generally increases as the object approaches the conductors. This effect can be used in a data input device, such as the simulation of a simple button, by determining when the capacitance across the conductors has changed by a given amount compared to a rest state.

U.S. Pat. No. 5,565,658 discloses a touch sensitive panel whereby a matrix of conductors are provided in an array. The conductors are in two layers; a first layer comprising a plurality of elongate "horizontal" conductors; and a second layer comprising a plurality of elongate "vertical" conductors in the same plane as the horizontal conductors and having their length perpendicular to the length of the horizontal conductors. By measuring the changes in capacitance of each pair of horizontal and vertical conductors, the location of an object pressing on or approaching the panel can be determined.

BRIEF SUMMARY OF THE INVENTION

According to a first aspect of the invention, we provide a capacitance sensing apparatus for use in a position sensing apparatus, comprising a first set of electrodes and a second set of electrodes and a capacitance sensing circuit arranged to determine, in use in a normal operating mode, the capacitance between each pairing of electrodes comprising one from the first set and one from the second set, in which the apparatus is further provided with at least one group switch arranged to selectively electrically connect together groups of the electrodes within the sets of electrodes, in which, in use in a low resolution mode of the apparatus the or each group switch connects together the groups of electrodes and the capacitance sensing circuit is arranged to determine the capacitance between the each pairing of groups of electrodes in one set and the electrodes or groups of electrodes of the other set.

Accordingly, the inventors have appreciated that, by connecting together groups of electrodes, greater sensitivity to the proximity of a conductive object such as a human finger can be had at the expense of resolution of the location of the object. Remembering that the change in capacitance diminishes with the distance of the object from the electrodes, this allows an object to be sensed at a greater distance whilst still allowing some position resolution.

Preferably, there is a group switch for each group of electrodes. Preferably, both of the first and second sets of electrodes may be provided with groups of electrodes and corresponding group switches. All, or a majority, of the electrodes of one or both sets may be divided into groups. Whilst it is preferable that the majority of groups within a set contain the same number of electrodes, it is possible for the groups from the first set and the groups from the second set to have differing number of electrodes. Typically, the groups of either set may have 3, 4 or 5 electrodes or possibly more. In one example, the groups of the first set of electrodes have 3 electrodes and the groups of the second set have 5.

The apparatus may also comprise at least one further group switch, which is arranged to selectively electrically connect at least one further group of electrodes within one or both sets, the further group or groups of electrodes each comprising more electrodes than the group of electrodes; in such a case the apparatus may have, in use an extra-low resolution mode in which the further group switch connects together the further groups of electrodes and the capacitance sensing circuit arranged to determine the capacitance between each pair of the further group or groups of one pair of electrodes on the one hand and at least one of the further group or groups of electrodes, the groups of electrodes or single electrodes on the other hand.

This allows a further increase in sensitivity at the expense of resolution. Typically, both sets of electrodes are separated into a further group or groups; the further group of one set of electrodes may comprise all of the electrodes of that set whereas the further group or groups of the other set may comprise the electrodes of the other set split into 1, (most preferably) 2 or 3 further groups. This can still provide some useful data as to the location of the object, whilst allowing for its detection at longer range.

The capacitance sensing circuit may comprise a first sub-circuit for use in the normal mode, and a second circuit for use in the low or extra-low resolution modes. In the extra-low resolution mode where the further group of one set comprises all of the electrodes of that set, that set of electrodes may be connected to ground and the second sub-circuit may comprise a sensor connected to the other set of electrodes and arranged to detect the capacitance due to a grounded object. Generally, body parts are connected to ground, so this is especially convenient.

The apparatus may further comprise a control circuit, arranged to switch the apparatus in use between its different resolution states. The control circuit may be arranged so that, in use, the state of the apparatus is switched depending on information relating to the distance of an object from the apparatus. The information may comprise a magnitude of a change in capacitance of pairs of the electrodes, as this depends on the distance of the object from the apparatus. The control circuit may switch to a lower resolution mode if the measured capacitance drops below a threshold. This can apply for both switching from the normal mode to the low resolution mode, and from the low resolution mode to the extra low resolution mode.

The apparatus may further comprise a display, such as a Organic Light Emitting Diode (OLED) display or a Thin Film Transistor (TFT) Liquid Crystal display (LCD); typically the display comprises selectively illuminatable segments in order to, in use, selectively display information to a user. The control circuit may also be arranged to activate the display, in use, when it senses the approach of an object. Preferably, it is arranged to activate the display in such a manner when it is the extra low resolution mode and/or the low resolution mode.

Preferably, each of the first and second sets of electrodes comprise a plurality of elongate electrodes generally parallel to one another; the electrodes of the first and second set may be angled relative to one another. In a particularly convenient embodiment, the electrodes of the first and second sets are parallel to one another.

According to a second aspect of the invention, there is provided a position sensing apparatus for detecting the proximity of an object and determining its location, comprising a capacitance sensing apparatus according to the first aspect of the invention, and a position determining circuit arranged to determine, in use, the position of an object in proximity to the apparatus from capacitances measured by the capacitance sensing apparatus.

According to a third aspect of the invention, there is provided use of the position sensing apparatus of the second aspect of the invention in a motor vehicle of the type having a central console between two passenger seats in which the position sensing apparatus is positioned, in which in the extra low resolution mode the position sensing apparatus is arranged to determine from which side of the apparatus an object is approaching.

This is preferably achieved by the apparatus comprising two further groups of electrodes on one set of electrodes, positioned so as to form two horizontally spaced groups. Each passenger seat of the car will therefore be closer to one further group of electrodes than the other.

The central console is typically part of the dashboard of the vehicle, positioned substantially halfway between the passenger seats.

Other advantages of this invention will become apparent to those skilled in the art from the following detailed description of the preferred embodiments, when read in light of the accompanying drawings.

BRIEF DESCRIPTION OF THE DRAWINGS

FIG. 1 shows a schematic view of the touch screen display of the first embodiment of the invention;

FIG. 4 shows the electrodes further grouped in an extra-low resolution mode of the touch screen display of FIG. 1;

DETAILED DESCRIPTION OF THE INVENTION

Figure 2:
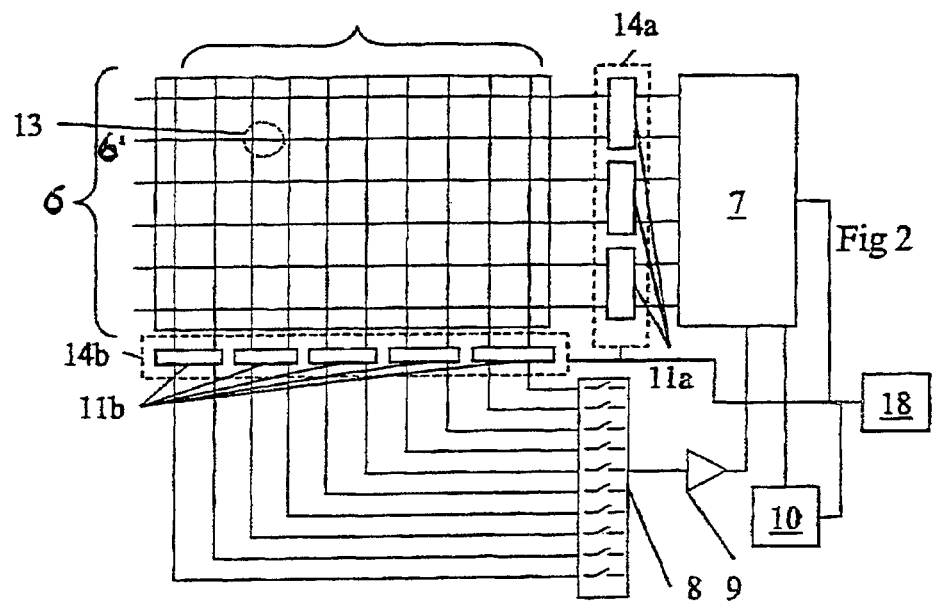
FIG. 2 shows the relative positioning of the electrodes of the touch screen display of FIG. 1.

A touch screen display 1 is shown in the Figures. This comprises a display panel 2, comprising a matrix of independently selectively illuminatable elements. Such displays are well known in the art and, typically, the display 2 comprises a TFT LCD or OLED matrix.

Above the display panel 2 is an electrode panel 3. This is a thin—approximately 0.5 mm thick—sheet of glass, with sets of transparent electrodes mounted on either side. Two sets of electrodes are provided. The first, "X" set 5 are provided on the top of the glass sheet, whereas the second, "Y" set 6 are provided on the bottom of the glass sheet. The electrodes of each set are elongate and parallel, with the electrodes of the two sets being perpendicular to one another. Typically, the electrodes are formed of a transparent conductive material such as Indium Tin Oxide (ITO).

Over the top of the display, there is a protective transparent cover 4, which functions only to prevent damage to the lower layers. It typically comprises glass or clear polymer material.

Figure 3:
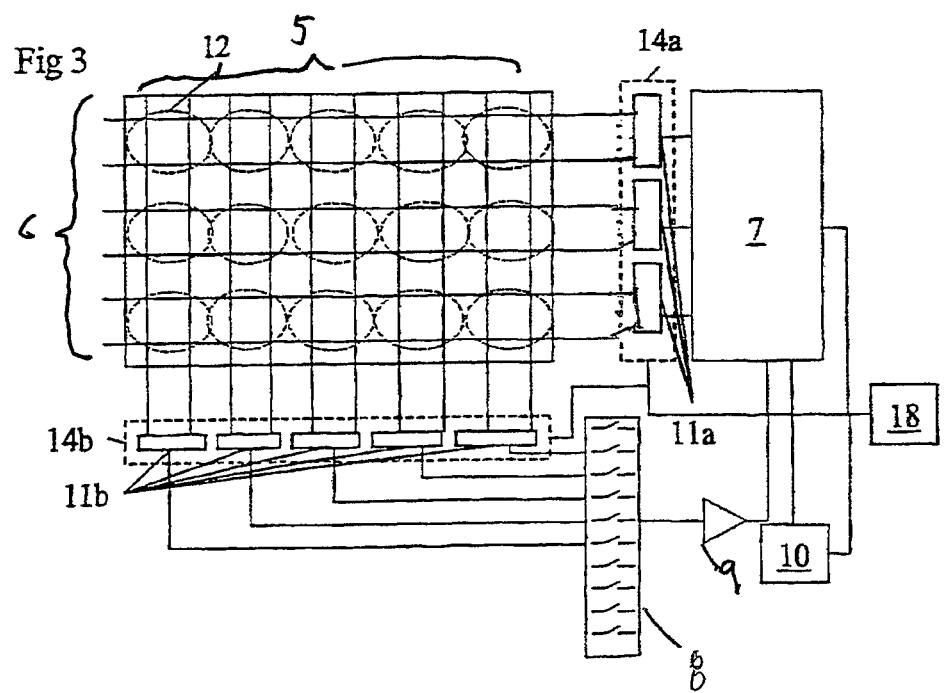
FIG. 3 shows the electrodes grouped in a low resolution mode of the touch screen display of FIG. 1.

The electrodes 5, 6 are connected to capacitance sensing circuit 7, shown in more detail in FIGS. 2 to 4 of the accompanying drawings. This applies drive signals to each of the electrodes of the second set 6 in turn. The signals thus applied to the second set of electrodes 6 induce currents in the first set of electrodes 5. This first set of electrodes 5 is connected to a multiplexer 8, which connects each of the electrodes, in turn, via amplifier 9 to the capacitance measuring circuit 7, where the amplified signal level is measured. This signal level gives an indication of the level of capacitance between the pair of electrodes comprising the electrode that the circuit 7 is currently driving and the electrode currently selected by the multiplexer 8. It is clear that by sequential stepping the driven electrode of the second set 6 and the electrode of the first set 5 selected by the multiplexer each pairing of electrodes from the first 5 and second set 6 can be achieved.

Furthermore, as discussed above, the signal level measured at the capacitance measuring circuit 7 will depend on the capacitance of the pair of electrodes. Any conductive object, such as a part of a body such as the human finger, will affect the capacitance and so the level of the signal measured at the capacitance sensing circuit 7.

Accordingly, the circuit further comprises a position sensing circuit 10 which is arranged to determine, from changes in capacitance for each of the pairs of electrodes, the position of an object close to the touch screen. Effectively, the position sensing circuit determines the pair of electrodes for which there is the largest change in capacitance and determines where on the display the electrodes of that pair cross, or works out the centroid of the changes in capacitance given the positions of the crossings of the pairs of electrodes and determines that the object is at that location. An example method of converting changes in capacitance to position can be seen in U.S. Pat. No. 5,565,658 discussed above. In the example shown in FIG. 2 of the accompanying drawings, if an object were to contact the display in the region 13 shown, then the capacitance change would be highest for the pairing of electrodes 5' and 6', and so the position sensing circuit 10 could determine from this change that the object had touched in the region 13.

This system operates satisfactorily at close range, where the change in capacitance due to the close proximity of the object to the display is sufficient for the capacitance sensing circuit 7 to detect a change in capacitance. However, once the capacitance sensor moves out of a certain range (approximately 0.5 cm) of the device, the capacitance sensor does not have enough sensitivity to discriminate the changes in capacitance from background noise and the like. Accordingly, the device is provided with a low resolution mode as shown in FIG. 3 of the accompanying drawings.

In this, two sets of group switches 11a, 11b have connected together the electrodes of each set into a plurality of groups. These group switches 11a, 11b electrically connect the groups of electrodes together in the low resolution mode, so that each group acts as one large electrode. The capacitance sensing circuit 7, the multiplexer 8, the amplifier 9 and the position sensing circuit 10 operate in the same manner as previously, except on fewer channels as there are less pairing of groups. The new area defined by a pairing of groups can be seen in FIG. 3 at reference numeral 12.

Accordingly, this leads to an increase in sensitivity, due to the increase in electrodes per group, but at the expense of a decrease in resolution. However, the decrease in sensitivity is not so important, given that, at this stage, the object is sufficiently far from the touch screen that it would be difficult to position the object sufficiently accurately relative to the touch screen in any case.

Whilst FIG. 3 of the accompanying drawings shows the electrodes grouped in pairs, it is likely that the groups will be larger than this. Typically, the electrodes will be grouped in threes in one direction and fives in the other.

This low resolution mode works sufficiently for a human finger at a range of up to about 5 cm. However, once the finger is out of this extended range, the same problems with the decrease in the change in capacitance due to extended range apply. Accordingly, the idea can be extended further to an extra-low resolution mode shown in FIG. 4 of the accompanying drawings.

In this case, further group switches 14a, 14b connect the electrodes into further groups larger than the groups of FIG. 3. It is noted that, for clarity, the group switches 11a and 11b are not shown in FIG. 4. In the case of the second set of electrodes 6, all of the electrodes are connected together into a single further group to ground and there is now no longer any need to separately drive them. The first set of electrodes 5 are split into two further groups each comprising roughly half of the display; this splits the display into a left half-panel 15 and a right half-panel 16. A further capacitance sensing circuit 17 is provided of the type arranged to determine changes in capacitance due to grounded objects (such as a human finger) approaching the display. Such circuits are well known in the field of proximity sensors and are used to determine the proximity of drivers' heads to vehicle airbags. This arrangement allows the detection of a finger at a distance of at least 10 cm.

The touch screen is controlled by a control unit 18. This controls the switching of the device between the normal, low resolution and extra low resolution modes. It does this dependent on the level of change of capacitance determined by the capacitive sensing circuits 7, 17. If there is little change in capacitance over a rest state observed, then the touch panel will operate in the extra-low resolution mode shown in FIG. 4. If an intermediate level of capacitance change is observed, then the control unit switches the touch screen into the low resolution mode shown in FIG. 3. If more than an upper threshold of capacitance change is observed, then the control unit 18 switches the touch screen into the normal mode shown in FIG. 2.

Furthermore, the control unit may also cause the display panel 2 to illuminate only when an object is detected; if no object is detected in the extra-low resolution mode, then the display 2 can be put to sleep. Once an object is detected and the touch screen enters the low resolution or normal modes, the display 2 can be illuminated. This allows for energy saving and conservation of the life of the display, as it is only illuminated when required; this can also prevent a driver of vehicle becoming distracted.

Figure 5:
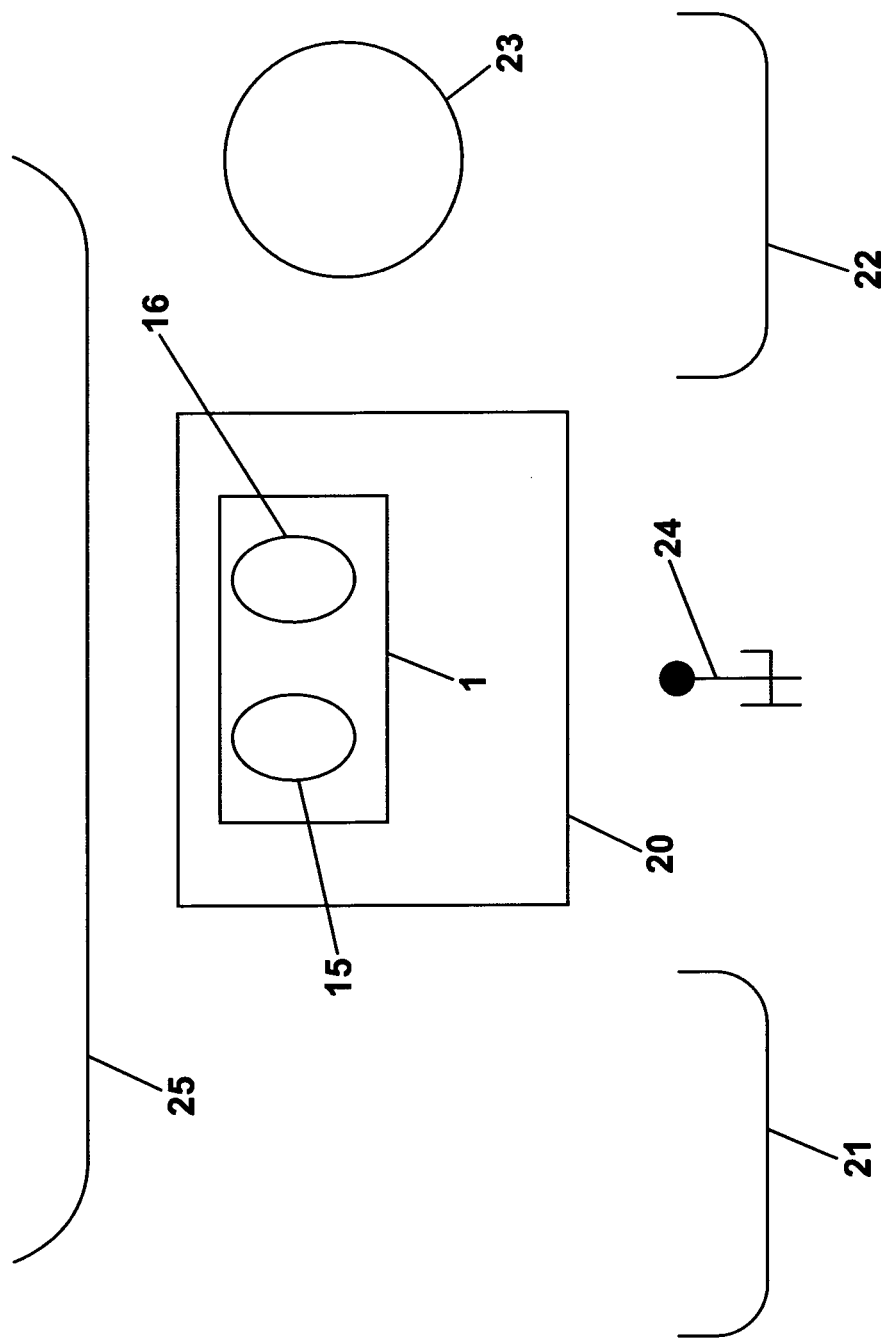
FIG. 5 shows the display of FIG. 1 installed in the central console of a car.

The touch screen display 1 is shown installed in the central control console 20 of a car in FIG. 5 of the accompanying drawings. The control console 20 is positioned between a driver's seat 22 and a passenger seat 21, above the gear selector 24, below windscreen 15 and next to steering wheel 23; the scheme depicted is for a right-hand drive vehicle but a mirror-equivalent of the situation would equally well apply in a left-hand drive car.

The display 1 is shown in the extra-low resolution mode of FIG. 4. In this case, the two areas 15 and 16 discussed above and shown in FIG. 4 enable a simple left/right indication of where an object such as the finger of a driver/passenger is; as the touch screen can then determine from which side the object is approaching and therefore determine whether the driver or a passenger is attempting to use the touch screen.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A capacitance sensing apparatus for use in a position sensing apparatus comprising:
    a first set of electrodes;
    a second set of electrodes;
    a capacitance sensing circuit arranged to determine, in use in a normal operating mode, the capacitance between each pairing of electrodes comprising one electrode from the first set of electrodes and one electrode from the second set of electrodes;
    at least one group switch arranged to selectively electrically connect together groups of said electrodes within said sets of electrodes to provide a low resolution operating mode of the apparatus with said capacitance sensing circuit arranged to determine the capacitance between each pairing of groups of electrodes in one set of electrodes and said electrodes of said other set of electrodes, and
    a control circuit arranged to switch the apparatus in use between its different resolution states, said control circuit being arranged so that, in use, the state of the apparatus is switched depending on information relating to the distance of an object from the apparatus.

2. The apparatus of claim 1 wherein there is a group switch for each group of electrodes.

3. The apparatus of claim 1 wherein both of said first set and second set of electrodes are provided with groups of electrodes and corresponding group switches.

4. The apparatus of claim 1, further comprising at least one further group switch, which is arranged to selectively electrically connect at least one further group of electrodes within each set of electrodes, said at least one further group of electrodes each comprising more electrodes than said group of electrodes; the apparatus having, in use, an extra-low resolution mode wherein said at least one further group switch connects together said further groups of electrodes and said capacitance sensing circuit is arranged to determine said capacitance between each pair of said further group of electrodes and at least one of the other further group of electrodes, the groups of electrodes and single electrodes.

5. The apparatus of claim 4 wherein both sets of electrodes are separated into a further group or groups.

6. The apparatus of claim 4 wherein said further group of one set of electrodes comprises all of said electrodes of that set whereas said further group or groups of the other set comprise the electrodes of the other set split into a plurality of further groups.

7. The apparatus of claim 1 wherein said capacitance sensing circuit comprises a first sub-circuit for use in said normal mode, and a second sub-circuit for use in said low resolution mode.

8. The apparatus of claim 4 wherein said capacitance sensing circuit comprises a first sub-circuit for use in said normal mode and a second sub-circuit for use in said extra-low resolution mode and further wherein said further group of one set of electrodes comprises all of the electrodes of that set, that set of electrodes is connected to ground in the extra-low resolution mode and the second sub-circuit used in the extra-low resolution mode and includes a sensor connected to the other set of electrodes and arranged to detect the capacitance due to a grounded object.

9. The apparatus of claim 1 wherein said information comprises a magnitude of a change in capacitance of pairs of the electrodes.

10. The apparatus of claim 1, further comprising a display, wherein said control circuit is arranged to activate said display, in use, when it senses the approach of an object.

11. The apparatus of claim 1 further including a position determining circuit arranged to determine, in use, the position of an object in proximity to said apparatus from capacitances measured by said capacitance sensing apparatus.

12. Use of the position sensing apparatus of claim 11 wherein the apparatus is installed in a motor vehicle of the type having a central console between two passenger seats in which the position sensing apparatus is positioned, in which in the extra low resolution mode the position sensing apparatus is arranged to determine from which side of the apparatus an object is approaching.

13. The apparatus of claim 1, further comprising a plurality of further group switches, which are arranged to selectively electrically connect at least one further groups of electrodes within each set of electrodes, said further groups of electrodes each comprising more electrodes than said group of electrodes; the apparatus having, in use, an extra-low resolution mode wherein said further group switches connect together said further groups of electrodes and said capacitance sensing circuit is arranged to determine said capacitance between each pair of said further groups of electrodes and at least one of the other further groups of electrodes, the groups of electrodes and single electrodes.

* * * * *

UNITED STATES PATENT AND TRADEMARK OFFICE
CERTIFICATE OF CORRECTION

| | | |
|---|---|---|
| PATENT NO. | : 8,415,960 B2 | Page 1 of 1 |
| APPLICATION NO. | : 12/516063 | |
| DATED | : April 9, 2013 | |
| INVENTOR(S) | : Roger John Hazelden | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 164 days.

Signed and Sealed this
Twenty-first Day of May, 2013

Teresa Stanek Rea
*Acting Director of the United States Patent and Trademark Office*